(12) United States Patent
Pakkala et al.

(10) Patent No.: US 6,290,742 B1
(45) Date of Patent: Sep. 18, 2001

(54) BAFFLE SYSTEM FOR SEPARATING LIQUID FROM A GAS STREAM

(75) Inventors: James L. Pakkala, Livonia; Guang Yu, Northville; Gregory M. Still, Plymouth, all of MI (US)

(73) Assignee: Durr Industries, Inc., Plymouth, MI (US)

( * ) Notice: Subject to any disclaimer, the term of this patent is extended or adjusted under 35 U.S.C. 154(b) by 0 days.

(21) Appl. No.: 09/472,327

(22) Filed: Dec. 23, 1999

(51) Int. Cl.$^7$ .................................................. B01D 45/08
(52) U.S. Cl. .......................... 55/443; 55/465; 55/DIG. 46
(58) Field of Search .............. 96/189–192, 197; 55/440, 442–444, 462, 465, DIG. 46

(56) References Cited

U.S. PATENT DOCUMENTS

| | | | |
|---|---|---|---|
| 3,168,030 | 2/1965 | Wilhelmsson et al. | 98/115 |
| 3,813,856 | * 6/1974 | Jensen | 55/444 |
| 3,932,151 | * 1/1976 | Lau | 55/465 X |
| 4,175,935 | 11/1979 | Gutermuth et al. | 55/269 |
| 4,227,895 | 10/1980 | Boon | 55/226 |
| 4,257,784 | 3/1981 | Gebhard et al. | 55/84 |
| 4,430,101 | 2/1984 | Sixsmith | 55/440 |
| 4,484,513 | 11/1984 | Napadow | 55/DIG. 46 |
| 4,557,740 | 12/1985 | Smith | 55/440 |
| 4,704,952 | 11/1987 | Johnson et al. | 98/115.2 |
| 4,802,901 | 2/1989 | Wurz et al. | 55/440 |
| 4,877,430 | * 10/1989 | Gutermuth | 55/440 X |
| 4,877,431 | * 10/1989 | Avondoglio | 55/443 X |
| 4,885,010 | 12/1989 | Rich et al. | 55/241 |
| 4,927,437 | 5/1990 | Richerson | 55/349 |
| 4,973,341 | 11/1990 | Richerson | 55/127 |
| 5,147,427 | * 9/1992 | Abbot et al. | 55/440 X |
| 5,352,257 | * 10/1994 | Powers | 55/444 |
| 5,536,288 | * 7/1996 | Dewitt et al. | 55/440 |

* cited by examiner

*Primary Examiner*—Robert H. Spitzer
(74) *Attorney, Agent, or Firm*—Howard & Howard

(57) ABSTRACT

A baffle system for removing liquid entrained in a gas stream which includes a plurality of generally coplanar columns of upright generally U-shaped baffle members each including a web portion and opposed flange portions on opposite sides of the web portion. The baffle members are conventionally arranged, such that the web portions of the first column of baffle members face the direction of flow of the gas and the second column opens toward the direction of flow with the web portions of each column overlapping. The width of the web portions of the baffle members is equal to at least three times the length of the flange portions and more preferably at least four times the width of the web portions. In one embodiment, the free ends of the flange portions include inwardly projecting lips or hook-shaped portions and the flange portions preferably do not overlap.

19 Claims, 2 Drawing Sheets

BAFFLE SYSTEM FOR SEPARATING LIQUID FROM A GAS STREAM

FIELD OF THE INVENTION

This invention relates to an improved baffle system for separating entrained liquids from a gas stream having improved efficiency.

BACKGROUND OF THE INVENTION

Baffle systems for separating liquid entrained in a gas stream have been used for many years. For example, baffle systems are conventionally used for separating water from an air stream in a paint application system. The paint overspray is washed from the paint application booth with water or a water emulsion. The water and paint overspray is then received through scrubbers generally located in the floor below the paint application booth. The gas scrubber removes paint particles from the air in the paint booth, entraining the paint particles in the liquid. The air stream is then passed through baffles, removing the entrained liquid from the air stream.

A common form of baffle used by the automotive industry in paint application systems, for example, comprise at least two columns of U-shaped rectangular vertical baffles. The baffles each include a web portion and perpendicular flange portions, such that the web portions of the first column of baffles faces the direction of the air flow and the second column of baffles overlaps the baffles in the first column with the flanges extending toward the direction of air flow. The baffle system thus requires the gas stream to flow around the web portions of the first column of baffles into the rectangular U-shaped baffles of the second column of baffles and around the flange portions of the second column of baffles, depositing the liquid on the baffles which flows downwardly and out of the system. The particle size of the liquid droplets or particles is generally greater than one micron (1 $\mu$m). In a conventional baffle system of this type, the width of the web portion is eight inches, the length of the flange portions are four inches and the flange portions overlap 0.25 inches. The average face velocity measured parallel to the duct in a baffle system for a paint application system of this type is generally between one hundred fifty to three hundred fifty feet per minute (fpm). The problem with baffle systems of this type is poor efficiency. That is, less than about fifteen percent of the entrained liquid is removed from the gas stream.

Various attempts have been made to improve the efficiency of baffle systems for removing entrained liquid from a gas stream. For example, the velocity of the gas stream through the baffle system may be increased by overlapping the ends of the flange portions, thereby improving the efficiency of the baffle system. However, a liquid having entrained paint particles will collect between the overlapping flanges requiring more frequent maintenance. It is also more difficult to clean between the overlapping flanges. More importantly, overlapping flanges provide only a very limited improvement in efficiency, generally not exceeding two or three percent. Other proposed attempts to improve the efficiency of baffle systems for removing entrained liquid from a gas stream include complex baffle systems including, for example, spiral baffles, baffles having hook-shapes which further increase the velocity of the gas stream through the baffles to improve efficiency, etc. However, such complex baffle systems are relatively expensive to manufacture and require frequent maintenance particularly where a tacky substance, such as paint, is entrained in the liquid droplets or particles. Such complex baffle systems have not been found suitable for removing liquid entrained in a gas stream in a paint application system.

Thus, there remains a long-felt need for an improved baffle system which is relatively simple in construction, low in cost and having improved efficiency. Further, there is a need to reduce the maintenance costs of conventional baffle systems which reduces the collection of liquid and entrained tacky particles and which is easily cleaned, if necessary. As described below, the improved baffle system of this invention is relatively simple in construction, having reduced costs, particularly when compared to the complex baffle systems described above, and the baffle system of this invention has reduced maintenance costs when compared to baffle systems having overlapping elements.

SUMMARY OF THE INVENTION

The baffle system of this invention is generally conventional in construction. However, it has been discovered that it is possible to significantly improve the efficiency of the baffle system by modifying the proportions and size of the baffle elements as set forth below. The baffle system of this invention includes a plurality of generally coplanar columns of baffle members, wherein the web portions of the baffle members of the first column overlap the web portions of the baffle members of the second column. The baffles are generally U-shaped, wherein the flange portions extend generally perpendicular to the web portions. Although the preferred embodiment of the baffles are generally rectangular having planar web portions and perpendicular planar flange portions for simplicity of construction and low cost, it will be understood that the web and flange portions may take various shapes and the flange portions may extend from the web portion at an angle other than ninety degrees. Conventionally, the web portion of the first column of baffles face the gas stream and the baffles of the second column open toward the gas stream with the flange portions extending toward the web portions of the adjacent first column of baffles. Further, the web portions of the first and second column of baffles overlap, such that the gas stream flows over the web portions of the first column of baffles into the open baffles of the second column and around the flange portions of the second column as described above.

As set forth above, the applicants have discovered that the liquid removal efficiency of baffle systems of this type may be increased by simply increasing the width of the web portions relative to the length of the flange portions and/or decreasing the overall size of the baffles. It is also possible to further increase the efficiency of the baffle system of this invention by including small opposed lips at the free end of the flange portions, although this improvement may result in increased maintenance over a rectangular U-shaped baffle. The width of the web portion is at least three times greater than the length of the flange portions or preferably three to ten times the length of the flange portions. In a more preferred embodiment, the width of the web portions of the baffle members is four to eight times the length of the flange portions or most preferably four to six times the length of the flange portions wherein the web portion is two to six inches. As described above, in a conventional baffle system of this type, the width of the web portion is eight inches and the length of the flange portion is four inches with an overlap between the opposed flange portions of approximately 0.25 inches. The efficiency of the baffle system of this invention is further improved by reducing the width of the web portion to six inches or less, more preferably five inches or less and most preferably four inches or less. In certain applications the opposed flange portions of the adjacent columns of baffles may overlap. However, in the preferred embodiment for applications wherein the entrained liquid includes a tacky substance such as paint particles, the flange portions do not overlap, significantly reducing maintenance costs. In the preferred embodiment of the baffle system of this invention, the distance between the web portions of the adjacent columns of baffle members is between about 0.3 to 0.7 of the width of the web portions or more preferably about one half the width. Further, the angle defined between the web portions and the direction of flow of the gas stream is between ninety degrees and one hundred thirty-five degrees.

Surprisingly, the efficiency of the baffle system of this invention may approach one hundred percent or four to five fold over a conventional baffle system of this type. The reasons for the improved efficiency of the baffle system of this invention is not fully understood. However, it is believed that the improvement in efficiency results from an increase in the velocity of the gas stream around the flange portions through the baffle system resulting from an increase in the baffle distribution density (i.e. the number of baffles per linear unit of measure) and a decrease in the distance between the baffle columns resulting from a reduction of the length of the flange portions, eliminating the requirement for overlapping flange portions. The increase in velocity of the gas stream through the baffles results in improved deposition efficiency of the liquid on the baffles. Nevertheless, the baffle system of this invention is simple in construction, low cost and the baffle system requires less maintenance to remove accumulated material. Further, where maintenance is required, it is possible to easily clean the baffles, particularly where there are no overlapping elements.

Other advantages and meritorious features of the baffle system of this invention will be more fully understood from the following description of the preferred embodiments, and the appended claims, a brief description of which follows.

DESCRIPTION OF THE EMBODIMENTS

Figure 3:
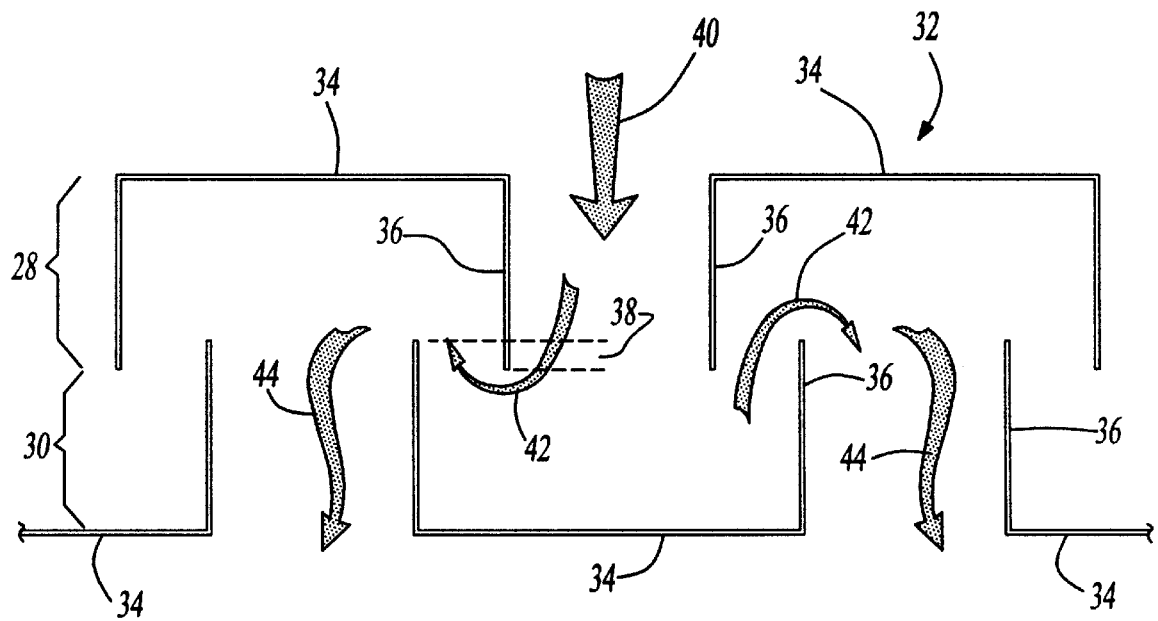
FIG. 3 is a cross sectional view of a prior art baffle system.

As set forth above, the baffle system of this invention separates entrained liquid from a gas stream. Baffle systems are used, for example, in a paint application booth, wherein the paint particles are washed from the air in the booth using water and the paint particles are transferred to the water in a gas scrubber generally located below the paint booth. The moisture laden air is then drawn through a baffle system which removes some of the water from the air. FIG. 3 illustrates a conventional baffle system used in this type of application. The baffle system includes columns 28 and 30 of identical spaced baffle members 32. As shown, the baffle members 32 are rectangular U-shaped vertical members each having a web portion 34 and flange portions 36 extending from opposed ends of the web portion 34. The web portions 34 of each column of baffle members overlap and one embodiment the flange portions of the adjacent columns overlap as shown at 38. The moisture laden air then flows between the adjacent baffle members 32 as shown at arrow 40, around the flange portions as shown at 42 and exit the baffle system as shown by arrow 44. In a conventional baffle system, the width of the planar web portion 34 is eight inches and the flange portion 36 is four inches. Where the flange portions overlap as shown at 38, the overlap is about one-quarter inch. As discussed below in regard to FIGS. 4 and 5, the removal efficiency of a baffle system of the type shown in FIG. 3 is about twelve to thirteen percent. That is, the baffle system shown in FIG. 3 removes twelve to thirteen percent of the water particles or drops from the air received at arrow 40. The overlap 38 between the flange portions 36 of the adjacent columns of baffles 28 and 30 was included to attempt to improve the removal efficiency of this baffle system. However, the overlap 38 also makes it more difficult to clean the baffles during routine maintenance. More importantly, the improvement in the removal efficiency resulting from the overlap 38 is only about two percent. There is therefore a substantial need to improve the water removal efficiency of baffle systems of this type. As will be understood, where the baffle system removes only ten to twelve percent of the water from the air, contaminants can continue through the system in the water particles, which may be vented to atmosphere.

Figure 1:
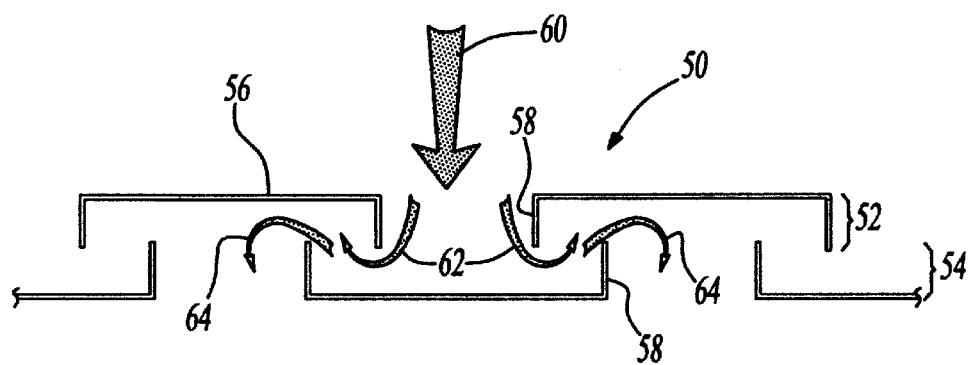
FIG. 1 is a partial end cross sectional view of the components of the baffle system of this invention.

As set forth above, the baffle system of this invention 50 shown in FIG. 1 is similar in configuration to the conventional baffle system shown in FIG. 3 but different in proportion. However, this modification results in a significant improvement in the moisture removal efficiency of several fold as discussed below. The baffle system shown in FIG. 1 includes opposed columns of baffles each having a web portion 56 and opposed flange portions 58. The air flow is received between the adjacent baffle members as shown by the arrow 60, the air flows around the opposed flange portions 58 as shown by arrow 62 and out of the baffle system as shown by arrow 64. Although the U-shaped baffle members shown in FIG. 1 are rectangular, the web portions 56 and flange portions 58 need not be planar and the flange portions may extend at an angle other than ninety degrees to the web portions. In the embodiment of the baffle system 50 shown in FIG. 1, the width of the web portions 56 of the baffle members is six inches and the length of the flange portions 58 is one inch. Thus, the width of the web portions is equal to six times the length of the flange portions. Further, the flange portions 58 of the columns 52 and 54 do not overlap in FIG. 1. This results in reduced accumulation of contaminants on the baffles as compared to overlapping flange portions 36 as shown at 38 in FIG. 3. As discussed below, the reduction in the width of the web portions from eight inches in FIG. 3 to six inches in FIG. 1 and the increase in the proportion of the web portions 56 relative to the flange portions 58 surprisingly results in a several fold improvement in the moisture removal efficiency.

Figure 2:
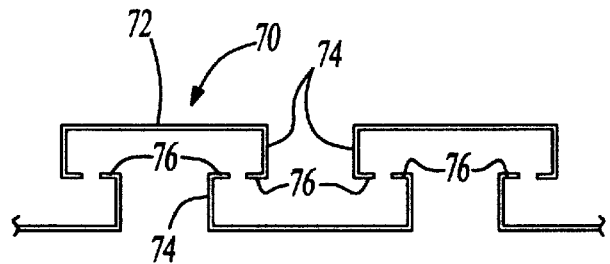
FIG. 2 is a partial end cross sectional view of components of an alternative embodiment of the baffle system of this invention.

The embodiment of the baffle system 70 shown in FIG. 2 is similar to the embodiment shown in FIG. 1 except that the width of the web portion 72 is four inches and the length of the flange portions 74 is one inch. Thus, the width of the web portions 72 is four times the length of the flange portion 74 in the embodiment shown in FIG. 2. Further, each of the flange portions include an inwardly projecting lip or hook portion 76 which further increases the moisture removal efficiency of this design because it increases the velocity of the air flow between the opposed flange portions. However, as set forth above, the hooks increase the required maintenance and therefore this embodiment would be preferred only where maintenance is not an issue, such as where moisture deposited on the baffle system 70 does not include a tacky contaminant, such as tacky paint particles. As shown in FIG. 2, the flange portions 74 do not overlap; however, the flange portions 58 and 74 and FIGS. 1 and 2 may overlap in certain applications.

Figure 4:
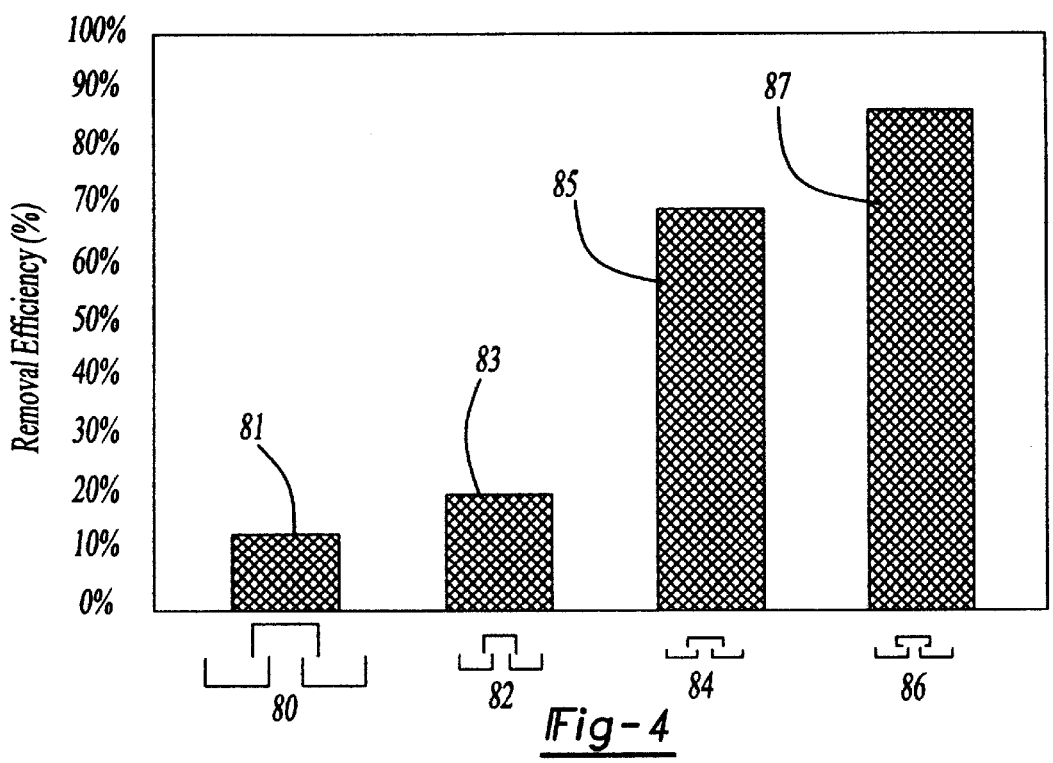
FIG. 4 is a bar chart illustrating the advantages of the baffle system of this invention.

The bar chart of FIG. 4 illustrates the surprising improvement in the moisture removal efficiency resulting from the change in size and proportions of the baffle system of this invention compared with the prior art. As shown at 80 in FIG. 4, the bar 81 illustrates the moisture removal efficiency of the prior art baffle system shown in FIG. 3, wherein the width of the web portions 34 is eight inches (see FIG. 3) and the length of the flange portions 36 is four inches and the flange portions overlap one quarter inch as shown at 38. The moisture deposition efficiency shown by bar 81 is about twelve percent. That is, eighty-eight percent of the moisture is not removed from the air and in a paint application system as described above, the liquid particles may contain contaminants which may be vented to atmosphere. In the baffle system 82 shown in FIG. 4, the width of the web portions is four inches, the length of the flange portions is two inches and the flange portions overlap one eight of an inch. Thus, as shown by bar 83, the removal efficiency of the embodiment 82 is increased to twenty percent. Thus, simply reducing the size of the baffles by fifty percent results in an eight percent improvement in the removal efficiency. However, this reduction in size still results in eighty percent of the moisture passing through the baffle system which in many applications is not acceptable.

In the embodiment of the baffle system 84 shown in FIG. 4, the width of the web portions is four inches and the length of the flange portions is one inch and the flange portions do not overlap. Thus, the width of the web portions in the baffle system shown at 84 is four times the length of the flange portions. As shown by bar 85, this embodiment results in a seventy percent moisture removal efficiency or about a seven fold increase in moisture removal efficiency compared to a conventional baffle system shown at 80 in FIG. 4 and FIG. 3. Stated another way, only thirty percent of the moisture remains in the air with the baffle system 84 shown in FIG. 4 compared to eighty eight percent with the baffle system 80. Finally, in the baffle system 86 shown in FIG. 4, the width of the web portions is four inches, the length of the flange portions is one inch and the flange portions of one of the columns include three eighth inch lips or hooks. As shown by bar 87, this results in an eighty seven percent removal efficiency or a further improvement in the removal efficiency of eighteen percent over the embodiment eighty four in FIG. 4. In this embodiment, only twelve percent of the moisture is not removed by the baffle system 86.

Figure 5:
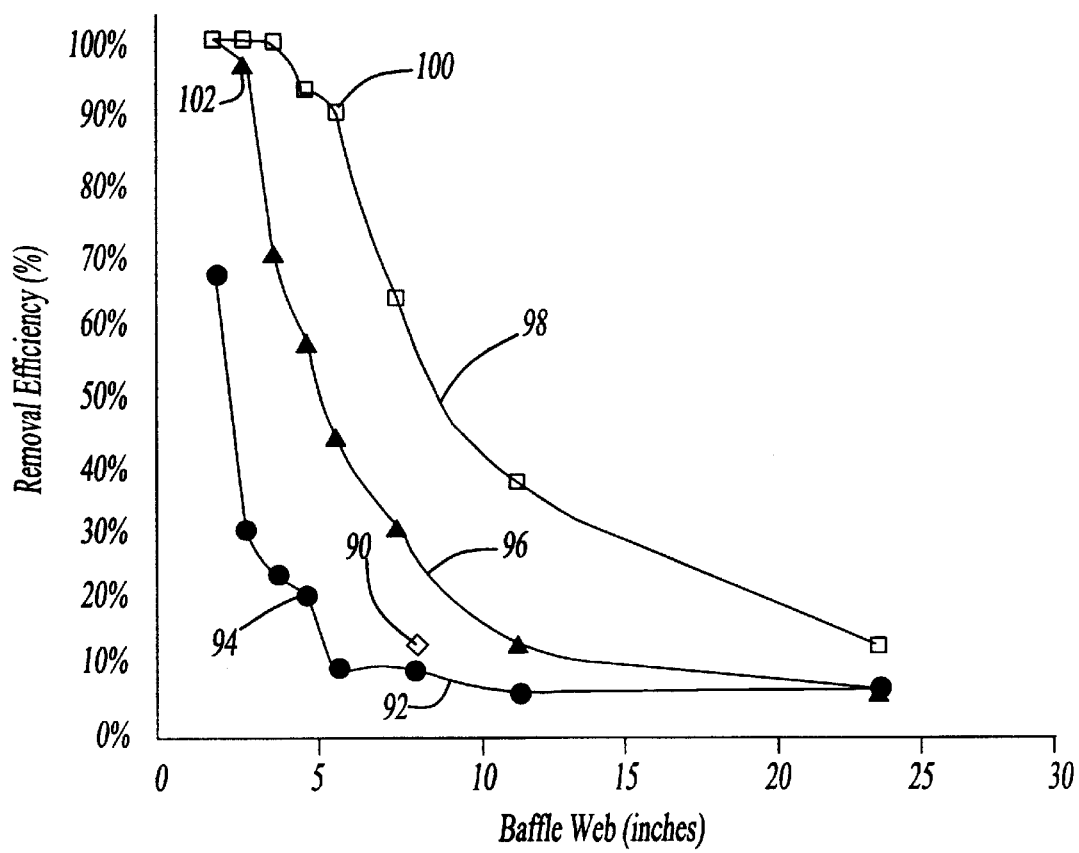
FIG. 5 is a graph illustrating the advantages of this invention.

FIG. 5 plots the moisture removal efficiency on the Y axis versus the width of the web of the baffle on the X axis. The prior art baffle system illustrated in FIG. 3 is shown at 90, wherein the width of the web portion is eight inches, the length of the flange portions is four inches and the flange portions overlap one quarter of an inch. The plot 92 illustrates the improvement in reducing the size of the baffles, wherein the width of the web portion is twice the length of the flange portions. As shown by plot 92, there is no significant improvement in the moisture removal efficiency until the width of the web portion is reduced to four inches as shown at 94 in FIG. 5. The plot 96 in FIG. 5 illustrates the improvement in efficiency wherein the ratio between the width of the web portion and the length of the flange portions is four to one. The plot 98 in FIG. 5 compares the moisture removal efficiency of a baffle system, wherein the ratio of the width of the web portion of the baffle versus the length of the flange portions is eight to one. The baffle systems illustrated by plots 96 and 98 do not include lip portions or hooks at the end of the flanges. As shown at 100 in plot 98, the moisture removal efficiency is ninety percent where the width of the web portion is six inches and the length of the flange portions is three quarters of an inch and the deposition removal efficiency approaches one hundred percent where the width of the web portion is four inches and the length of the flange portions is one inch. As shown at 102 in plot 96, the deposition efficiency is about ninety seven percent where the width of the web portion is three inches and the ratio between the width of the web portion and the length of the flange portions is four to one.

The plot of FIG. 5 was based upon a face velocity of the air stream of two hundred feet per minute and a water particle size of twenty $\mu$m. In the preferred embodiments of the baffle system of this invention, the spacing between adjacent baffles is about one-half of the length of the web portion. Thus, in a baffle system of this invention wherein the width of the web portions is four inches and the length of the flanges is one inch, the space between the baffles is two inches. Based upon the experimental and calculated data shown in FIGS. 4 and 5, a baffle system of the type shown in FIG. 1, wherein the width of the web portions of the baffles is four inches and the length of the flange portions is one inch is a good compromise between the cost of the baffle system and the improvement in moisture removal efficiency. That is, the channel or U-shaped baffle members are simple to manufacture from steel or other suitable materials. The baffle members must be upright, such that the liquid flows down the baffles for collection. However, the baffles need not be vertical or ninety degrees relative to horizontal, but may be angled relative to horizontal. Further, the plane of the web portions need not be perpendicular to the gas flow, but may range from ninety degrees to one hundred thirty-five degrees with good efficiency. Further, depending upon the application, the baffle members may be formed of plastic.

The significant improvement in moisture removal or deposition efficiency resulting from the reduction in size of the baffle members and change in proportions is not fully understood. However, it is now known that increasing the velocity of the gas through the baffle system and decreasing the turning radius of the gas around the flange portions results in improved efficiency. As will be understood, the momentum of the water droplets or particles is significantly greater than the gas molecules. Thus, by decreasing the turning radius by shortening the flange portions relative to the web portions and by decreasing the width of the web portions results in a significant improvement in liquid removal of several fold as set forth above. This relatively simple modification of a conventional baffle system was not recognized by the prior art or the assignee of this application until the completion of the experimental studies discussed above.

Having described the preferred embodiments of the baffle system of this invention, it will be understood that various modifications may be made to the baffle system as described above within the purview of the appended claims. Having described the invention, it is now claimed, as follows:

What is claimed is:

1. A baffle system for separating entrained liquid from a gas stream, comprising: a plurality of generally coplanar columns, each column comprising a plurality of spaced generally U-shaped baffle members, each baffle member having a web portion and flange portions extending generally perpendicular from opposite sides of said web portion and each flange portion having a free end spaced from said web portion, including a first column of said baffle members having said flange portions extending away from a direction of flow of said gas stream and a second adjacent column of said baffle members each having flange portions extending toward said web portions of said first column of baffle members toward said direction of flow of said gas stream with said web portions of said first column of baffle members overlapping said web portions of said second column of baffle members, wherein the width of said web portions of said baffle members is equal to or greater than three times the length of said flange portions.

2. The baffle system for separating entrained liquid from a gas stream as defined in claim 1, wherein said free ends of said flange portions of said first column of baffle members do not overlap said free ends of said flange portions of said second column of baffle members.

3. The baffle system for separating entrained liquid from a gas stream as defined in claim 1, wherein said free ends of said flange portions include opposed inwardly projecting lip portions.

4. The baffle system for separating entrained liquid from a gas stream as defined in claim 1, wherein said width of said web portions of said baffle members relative to said length of said flange portions is four to one or greater and said width of said web portions is six inches or less.

5. The baffle system for separating entrained liquid from a gas stream as defined in claim 1, wherein said width of said web portions of said baffle members is four inches or less.

6. The baffle system for separating entrained liquid from a gas stream as defined in claim 5, wherein said width of said web portions of said baffle members are equal to or greater than four times the length of said flange portions.

7. The baffle system for separating entrained liquid from a gas stream as defined in claim 1, wherein the distance between said web portions of said first and second column of baffles is between about 0.3 to 0.7 of said width of said web portions.

8. The baffle system for separating entrained liquid from a gas stream as defined in claim 1, wherein said baffle members are generally vertical.

9. The baffle system for separating entrained liquid from a gas stream as defined in claim 1, wherein the angle between said baffle members and said direction of flow of said gas stream is between ninety plus or minus forty-five degrees.

10. A baffle system for separating entrained liquid from a gas stream, comprising: a plurality of generally coplanar columns, each column comprising a plurality of spaced generally upright generally U-shaped baffle members, each baffle member having a web portion and flange portions extending from opposite sides of said web portion each having a free end, including a first column of baffle members having said flange portions of said baffle members extending away from a direction of flow of said gas stream and a second adjacent column of baffle members web portions overlapping said first column of baffle members, wherein the width of said web portions of each of said baffle members is about six inches or less and at least three times the length of said flange portions.

11. The baffle system for separating entrained liquid from a gas stream, as defined in claim 10, wherein said free ends of said flange portions each include opposed inwardly projecting lip portions.

12. The baffle system for separating entrained liquid from a gas stream, as defined in claim 11, wherein the width of said lip portions measured from said flange portions is equal to 0.125 to 0.50 inches.

13. The baffle system for separating entrained liquid from a gas stream, as defined in claim 10, wherein said free ends of said flange portions of said first and second columns of baffle members do not overlap.

14. The baffle system for separating entrained liquid from a gas stream, as defined in claim 10, wherein said width of each of said web portions of said baffle members relative to said length of said flange portion is four to one or greater.

15. The baffle system for separating entrained liquid from a gas stream, as defined in claim 10, wherein said width of each of said web portions of said baffle members is four inches or less.

16. The baffle system for separating entrained liquid from a gas stream, as defined in claim 10, wherein the distance between said web portions of said first and second columns of baffle members is between 0.3 to 0.7 of the width of said web portions.

17. The baffle system for separating entrained liquid from a gas stream, as defined in claim 10, wherein said flange portions extend generally perpendicular to said web portions and said baffle members are generally vertical.

18. The baffle system for separating entrained liquid from a gas stream, as defined in claim 10, wherein the angle between said web portions and said direction of flow of said gas is between ninety plus or minus forty-five degrees.

19. A baffle system for separating entrained liquid from a gas stream, comprising:

a plurality of generally coplanar columns, each column comprising a plurality of spaced generally upright generally U-shaped baffle members, each baffle member having a web portion and flange portions extending from opposite sides of said web portion each having a free end, including a first column of baffle members extending away from a direction of flow of the gas stream, wherein the width of said web portion of each of said baffle members is about four inches or less and at least two times the length of said flange portions.

* * * * *